Sept. 6, 1932.                T. C. LENNOX                 1,876,427
ELECTRICAL CIRCUIT REGULATING MEANS
Filed Jan. 4, 1930
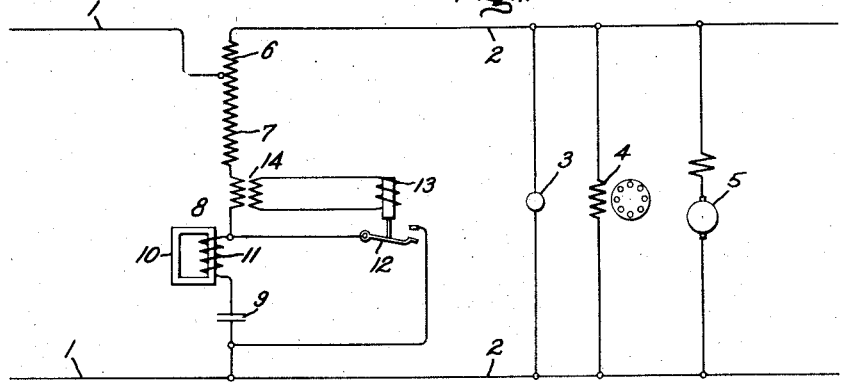
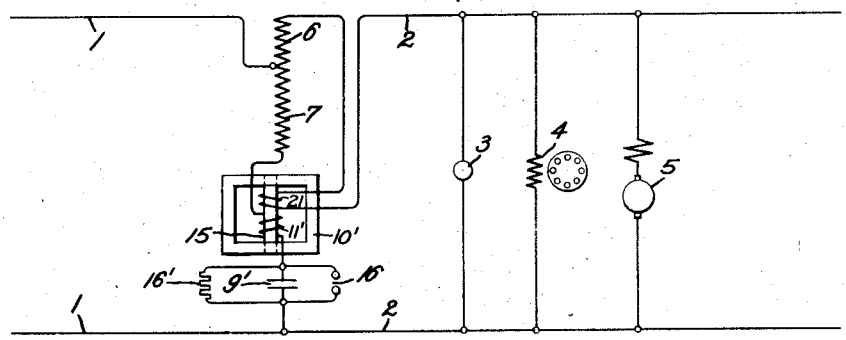
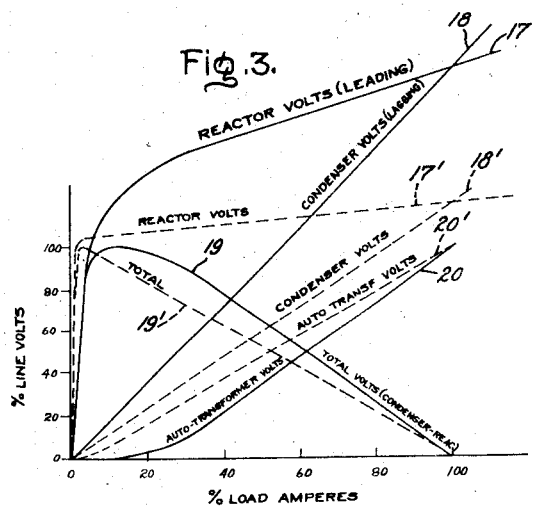
Inventor:
Thomas C. Lennox,
by Charles E. Mullan
His Attorney.

Patented Sept. 6, 1932

1,876,427

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

ELECTRICAL CIRCUIT REGULATING MEANS

Application filed January 4, 1930. Serial No. 418,634.

My invention relates to electrical circuit regulating means and more particularly to regulating means for controlling an electrical condition of a machine or circuit.

In regulating the voltage of alternating current feeder circuits, for example, it is desirable to provide a regulating arrangement which will give sufficient boost in voltage to compensate for the drop in voltage in these circuits under load, especially when the load includes a considerable portion of reactive devices such as refrigerator motors or translating devices having similar characteristics. Various arrangements have been used for regulating the voltage or another electrical condition of a circuit. Many of these arrangements involve the use of moving contacts or moving parts possessing considerable inertia and are not free from disadvantages under the various operating conditions encountered in practice.

It is an object of my invention to provide a new and improved regulating means which is self contained and entirely automatic in operation, and which is free from moving parts.

It is another object of my invention to provide a new and improved combination of inductive and capacitive devices for regulating an electrical condition of an electrical circuit or machine.

My invention will be better understood from the following description taken in connection with the accompanying drawing and its scope will be pointed out in the appended claims.

In the drawing, Fig. 1 is a diagrammatic representation of a regulating system wherein my invention has been embodied; Fig. 2 is a modification of the embodiment shown in Fig. 1, and Fig. 3 is a diagram of characteristic curves for explaining the operation of the regulating means and for illustrating in a general way the comparative operating characteristics of the illustrated embodiments of the invention.

Referring to Fig. 1 of the drawing, wherein, by way of illustration, I have shown an embodiment of my invention in a regulating system for controlling the voltage of an alternating current feeder, conductors 1 represent an alternating current supply circuit and conductors 2 represent an alternating current load circuit. Load devices, connected to be energized from the conductors 2, are illustrated as including a lamp or resistance load 3, an induction motor load 4, and an alternating commutator type of motor load 5. These load devices represent the usual feeder load. The supply conductors 1 are connected to energize transforming means, shown as an auto transformer, having a coil 6 connected in series with the load circuit by means of which the necessary boost in voltage is to be obtained, and a coil 7 connected across the supply conductors 1 in series with an impedance comprising a reactor 8 having a continuous magnetic circuit and a capacitance 9, both having particular volt-ampere characteristics hereinafter pointed out for obtaining the desired operating characteristics in accordance with my invention. In this embodiment of my invention the reactor comprises a simple continuous iron core 10 upon which is wound a coil 11, and the capacitance 9 may be the well known static condenser or capacitor.

With an arrangement of this type I have found that under certain operating conditions harmonic resonance may occur due to a critical relationship that arises between the inductance of the auto-transformer and reactor and the capacitance of the condenser. This condition may be brought about by overloads or by a transient load or voltage on the circuit and may continue after the initiating cause has been removed. Since a resonant condition in this arrangement results in excessive losses, excessive voltage strain on the condenser and a lowering of the load circuit voltage, it is desirable to provide means for preventing the existence of resonant conditions or for suppressing the condition as soon as the cause is removed. Accordingly, I provide an automatic switch or contactor 12 with its contacts in parallel with the circuit comprising the reactor 8 and the condenser 9. The contactor 12 is provided with an operating winding 13 which is connected to be energized in accordance with the current due to resonance. As shown, winding 13 is connected in series relation with the winding 11 of reactor 8 through any suitable means shown as a current transformer 14.

The contactor 12 is arranged to close its contacts and thereby short circuit the reactor and condenser when the current through transformer 14 exceeds a predetermined value and to open its contacts when the current decreases below the predetermined value. With this arrangement the load current is effective to operate the contactor 12 with predetermined overloads and also in case of resonant current conditions due to current or voltage transients or other causes. A simpler and satisfactory arrangement is to provide a lightning arrester or discharge device connected across the capacitor as shown in Fig. 2.

In Fig. 2 I have illustrated a modification of the previously described embodiment of my invention wherein I employ a reactor having a different volt-ampere characteristic from that of the simple iron core reactor decreasing thereby the required $kv.a.$ rating of the condenser employed, improving the volt-ampere characteristic of the auto-transformer volts, and decreasing the load losses in the regulating apparatus. Since the regulating action depends upon the variable reactance of the reactor I have found that it is preferable to use a reactor having a core of ferro-magnetic material having a much more definite saturation point and a straighter and flatter curve beyond the initial saturation point than in the case of ordinary iron. A suitable ferro-magnetic material is a nickel-and-iron alloy and particularly the alloy known to the trade as "permalloy" consisting approximately of $78\frac{1}{2}$ percent nickel and $21\frac{1}{2}$ percent iron. Although the reactor core may be constructed wholly of the nickel-and-iron alloy in the form of the simple closed core illustrated in Fig. 1, it is desirable to minimize the amount used since the nickel-and-iron alloys are considerably more expensive than iron. I have found that the desired characteristics can be obtained by using the iron core 10 of Fig. 1 and inserting a nickel-and-iron alloy section 15 in the center section of the core making thereby a three-legged core in which the middle leg is of the alloy. The laminations of the alloy may be conveniently interleaved with the laminations of the iron yoke and in such proportion that the maximum flux which will exist in the alloy section will be insufficient to saturate the iron part of the core. The winding 11' is then placed on the alloy leg 15. In order to avoid the condition of resonance previously referred to in connection with the arrangement shown in Fig. 1, I provide, in this modification a discharge device designated as 16 which is connected across the condenser 9' and illustrated as a spark discharge device having spaced electrodes. The automatic switching arrangement may also be employed in the same manner as illustrated in Fig. 1, and other discharge devices such as lightning arresters or resistance discharge devices may be connected across the capacitor as shown at 16'. A resistance discharge device which I have found to be suitable comprises resistance material having a nonlinear volt-ampere characteristic such that its resistance decreases with increase of potential but being substantially an insulator at normal potentials and a good conductor at higher potentials. More particularly the resistance discharge device may consist of a resistance element having a hyperbolic resistance-ampere characteristic, for example, a ceramic material of granulated carborundum combined with free carbon with a binder and subjected to heat treatment and firing as described and claimed in an application, Serial No. 198,512, of Karl B. McEachron, filed June 13, 1927, and assigned to the same assignee as this application.

The operation of the illustrated embodiments of my invention will be explained by reference to Fig. 3 wherein various characteristic curves for the devices of Figs. 1 and 2 are plotted between percent line volts as ordinates and percent load amperes as abscissæ for illustrating in a general way the performance of the various elements of the regulating system. The characteristic curves for the various devices of Fig. 1 are represented by solid lines while the corresponding curves for the various devices of Fig. 2 are represented by dotted lines. Curve 17 represents the volt-ampere characteristic of the simple type of iron core reactor and is further identified by the description "reactor volts" while curve 17' represents the same characteristic for the iron core reactor having a nickel-and-iron alloy section as illustrated in Fig. 2. Curve 18 represents the volt-ampere characteristic of the capacitor 9 and is further identified by the designation "condenser volts", while curve 18' represents the same characteristic for the capacitor 9'. Since the reactor and capacitor devices are in series the voltage across the combination will be the vector sum of their voltages and as these voltages are of low power factor, the one leading and the other lagging, the resultant voltage will be substantially equal to their difference. This is shown in curve 19 marked "total volts" for the arrangement of Fig. 1 and by curve 19' for the arrangement of Fig. 2. It will be observed that the resultant voltage reaches a maximum at a very small load due to saturation of the reactor core and then progressively decreases until it reaches zero. The reactor-capacitor combination, in its regulating range, thereby exhibits a negative impedance-current characteristic. The voltage applied to the auto-transformer, which will be approximately equal to the difference between the "total volts" and the supply voltage, consequently has a low value at light loads and progressively increases until its normal value is reached, at or about full load. The auto-transformer thus is made to give a progressively increasing boost of voltage to the load circuit as the load increases. Curves 20 and 20' illustrate this condition for the embodiments of Figs. 1 and 2, respectively. In order that an excessive boost shall not be obtained at no load, the auto-transformer is preferably provided with an air gap in its core so that it takes a large exciting current, thus causing the light-load or no-load voltage to appear across the reactor rather than the auto-transformer. However, with this arrangement there is still a small voltage on the auto-transformer at no load. Since in some cases it is desirable to have no voltage boost at no load additional means may be provided for preventing this undesirable boost. Such means may consist of a second winding 21 positioned on the reactor core 15, as illustrated in Fig. 2, and connected to be energized in accordance with the current in the supply circuit or load circuit. As shown winding 21 is connected in series with conductor 2 of the load circuit and is arranged to have such a polarity as will cause the voltage generated in this second winding to be subtracted from the output voltage. If the number of turns in this winding is correctly proportioned the total output voltage may be exactly equal to the input voltage at no load. I have found that this arrangement is much more satisfactory when used with a reactor provided with the nickel-iron alloy core, as illustrated in Fig. 2, than when used with a simple iron core reactor, because in the latter case the voltage generated in the supplementary winding increases appreciably with load and consequently reduces the boost in output voltage under load.

While I have shown and described particular embodiments of my invention it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination of a circuit, a transformer for controlling the voltage of said circuit, said transformer having a series winding connected in said circuit and a shunt winding connected across said circuit, and means comprising a reactor having a closed magnetic core and a capacitor connected in series with the shunt winding of said transformer, said reactor being arranged to saturate at a current substantially below its normal full load current in such a manner that the resultant voltage drop across said reactor and capacitor shall decrease as the current in said circuit increases.

2. The combination of a circuit, an auto-transformer having a portion of its winding connected in shunt to said circuit and the remaining portion connected in series with said circuit, a reactor arranged to saturate at a value of current substantially below its normal full load current and a capacitor both connected in series with the first mentioned portion of said transformer winding.

3. The combination of a circuit, means for controlling an electrical condition of said circuit, means comprising an inductance and a capacitance for controlling an electrical condition of said circuit controlling means, said inductance and capacitance being constructed and arranged to have a resultant volt-ampere characteristic which changes inversely with the current in said circuit above a predetermined value, and means for maintaining said inductance and capacitance in a non-resonant condition.

4. The combination of a circuit, a transformer comprising a winding connected in shunt to said circuit and a winding connected in series with said circuit, a reactor having a closed magnetic core and a static condenser for controlling the voltage applied to said shunt winding in accordance with the current in said circuit, and means for limiting the voltage rise across said condenser.

5. The combination of a circuit, an auto-transformer having a portion of its winding connected in shunt to said circuit and the remaining portion connected in series with said circuit, a reactor arranged to saturate at a value of current substantially below its normal full load current and a capacitor connected in series relation with the first mentioned portion of said transformer winding, and discharge means connected in a shunt circuit to said capacitor.

6. In combination, a substantially constant voltage supply circuit, a load circuit, and means connected in parallel relation with said circuits including a reactor arranged to saturate at a value of current substantially below its normal full load current and a capacitor connected in series with said reactor for effecting an increase in the voltage applied to said load circuit in accordance with the increase of current in said load circuit.

7. The combination of a circuit, an auto-transformer having a portion of its winding connected in shunt to said circuit and the remaining portion connected in series with said circuit, a reactor arranged to saturate at a value of current substantially below its normal full load current and a capacitor connected in series relation with the first mentioned portion of said transformer winding, and a discharge means comprising a resistance element having a non-linear resistance-ampere characteristic connected in parallel with said capacitor.

8. Electrical circuit controlling means comprising inductive and capacitive devices connected in series relation, said inductive device having a core section of ferro-magnetic material such that the resultant voltage of said inductive and capacitive devices shall vary as a substantially linear function of the current through said devices above a value of current substantially below the normal current rating of said inductive device.

9. Electric circuit controlling means comprising inductive and capacitive devices connected in series relation, said inductive device having a core section of nickel-and-iron alloy such that the volt-ampere characteristic of said inductive device above a predetermined value of current shall be a straight line substantially parallel to the ampere axis of said characteristic beyond the initial point of saturation.

10. Electric circuit controlling means comprising inductive and capacitive devices connected in series relation, said inductive device being provided with a nickel-and-iron alloy core, and a discharge device connected in parallel to said capacitive device and comprising a resistance element having a hyperbolic resistance-ampere characteristic and being substantially an electrical insulator below a predetermined voltage and an electrical conductor at voltages above said predetermined voltage.

11. Electric circuit controlling means comprising an inductive device including a winding and a capacitive device connected in series relation, said inductive device having a three-legged core with the yoke portion of iron and the middle leg with said winding mounted thereon of a nickel-and-iron alloy in such proportion that the maximum flux which will exist in the alloy section will be insufficient to saturate the iron part of the core.

12. The combination of a circuit, an autotransformer having a portion of its winding connected in shunt to said circuit and the remaining portion connected in series with said circuit, a reactor including an energizing winding and a capacitor connected in series relation with the first mentioned portion of said transformer winding, said reactor having a three-legged core with the yoke portion of iron and the middle leg with said energizing winding mounted thereon of a nickle-and-iron alloy in such proportion that the maximum flux which will exist in the alloy section will be insufficient to saturate the iron part of the core, and a discharge device connected in parallel to said capacitor and comprising a resistance element having a hyperbolic resistance-ampere characteristic and being substantially an electrical insulator below a predetermined voltage and an electrical conductor at voltages above said predetermined voltage.

13. The combination of a circuit, a transformer comprising a winding connected in shunt to said circuit and a winding connected in series with said circuit, a reactor having a closed magnetic core and a capacitance for controlling the voltage applied to said shunt winding in accordance with the current in said circuit, means for preventing a voltage increase by said transformer when the current in said circuit is substantially zero, and means for limiting the voltage rise across said capacitance.

14. The combination of a circuit, an autotransformer having a portion of its winding connected in shunt to said circuit and the remaining portion connected in series with said circuit, a reactor arranged to saturate at a value of current substantially below its normal full load current and a capacitor connected in series relation with the first mentioned portion of said transformer winding, a winding associated with said reactor and connected to be energized in accordance with the current in said circuit such that its voltage will be in opposition to the output voltage of said transformer, and discharge means connected in a shunt circuit to said capacitor.

15. The combination of a circuit, an autotransformer having a portion of its winding connected in shunt to said circuit and the remaining portion connected in series with said circuit, a reactor including an energizing winding and a capacitor connected in series relation with the first mentioned portion of said transformer winding, said reactor having a three-legged core with the yoke portion of iron and the middle leg with said energizing winding mounted thereon of a nickel-and-iron alloy in such proportion that the maximum flux which will exist in the alloy section will be insufficient to saturate the iron part of the core, a supplementary winding connected in series with the output circuit of said transformer and positioned on the middle leg of said reactor, and a discharge device connected in parallel to said capacitor and comprising a resistance element having a hyperbolic resistance-ampere characteristic.

16. In combination, an alternating current circuit, a booster transformer having a series winding connected in said circuit and a shunt winding connected across said circuit, and means having a negative impedance-current characteristic connected in series with said shunt winding.

17. In combination, an alternating current system, a regulating transformer connected therein, and a negative impedance-current characteristic arrangement connected to carry substantially the difference between the input and output currents of said transformer, said arrangement also being connected to vary the voltage of said transformer inversely with the impedance voltage drop across it.

In witness whereof, I have hereto set my hand this 31st day of December, 1929.

THOMAS C. LENNOX.